United States Patent [19]
Anderson

[11] 3,851,957
[45] Dec. 3, 1974

[54] AUTOMATIC SOUND FILM PROJECTOR-PLAYER

[76] Inventor: Ray C. Anderson, 6655 S. New Haven, Tulsa, Okla. 74136

[22] Filed: Mar. 23, 1972

[21] Appl. No.: 237,253

[52] U.S. Cl................. 352/123, 242/181, 242/192, 242/195, 352/157
[51] Int. Cl......................... G03b 1/56, G03b 23/02
[58] Field of Search ........... 242/181, 180, 192, 195, 242/197, 198, 199, 200, 71.2, 71.1; 274/4 B, 4 C, 11 B, 11 C; 179/100.2 Z, 100.2 ZA; 352/72, 78, 123, 157, 158

[56] References Cited
UNITED STATES PATENTS

| | | | |
|---|---|---|---|
| 2,539,521 | 1/1951 | Owens | 242/200 |
| 2,964,593 | 12/1960 | Kleve | 242/180 X |
| 3,081,668 | 3/1963 | Nistri | 352/123 |
| 3,149,797 | 9/1964 | Pastor et al. | 242/195 |
| 3,383,156 | 5/1968 | Fried et al. | 352/123 |
| 3,524,949 | 8/1970 | Kleve | 242/181 |
| 3,550,879 | 12/1970 | Bundschuh et al. | 242/192 |
| 3,614,022 | 10/1971 | Henriksen | 242/198 |
| 3,674,347 | 7/1972 | Iha | 352/123 X |
| 3,690,751 | 9/1972 | Von Fischern et al. | 242/181 X |

Primary Examiner—George F. Mautz
Attorney, Agent, or Firm—Frank R. Thienpont

[57] ABSTRACT

A home entertainment unit comprising a self threading sound film projector and an automatic film cartridge selector mechanism for presenting selectively or in sequence a plurality of films to the projector. The cartridges are loaded into a plurality of retaining pockets formed in the top of a magazine drum that is mounted to rotate in a horizontal plane and be selectively held in a plurality of angular positions. Solenoid actuated drive motors are sequentially brought into contact with the film for feeding the film from a film cartridge to the projector and rewinding the film into a cartridge upon completion of play.

6 Claims, 8 Drawing Figures

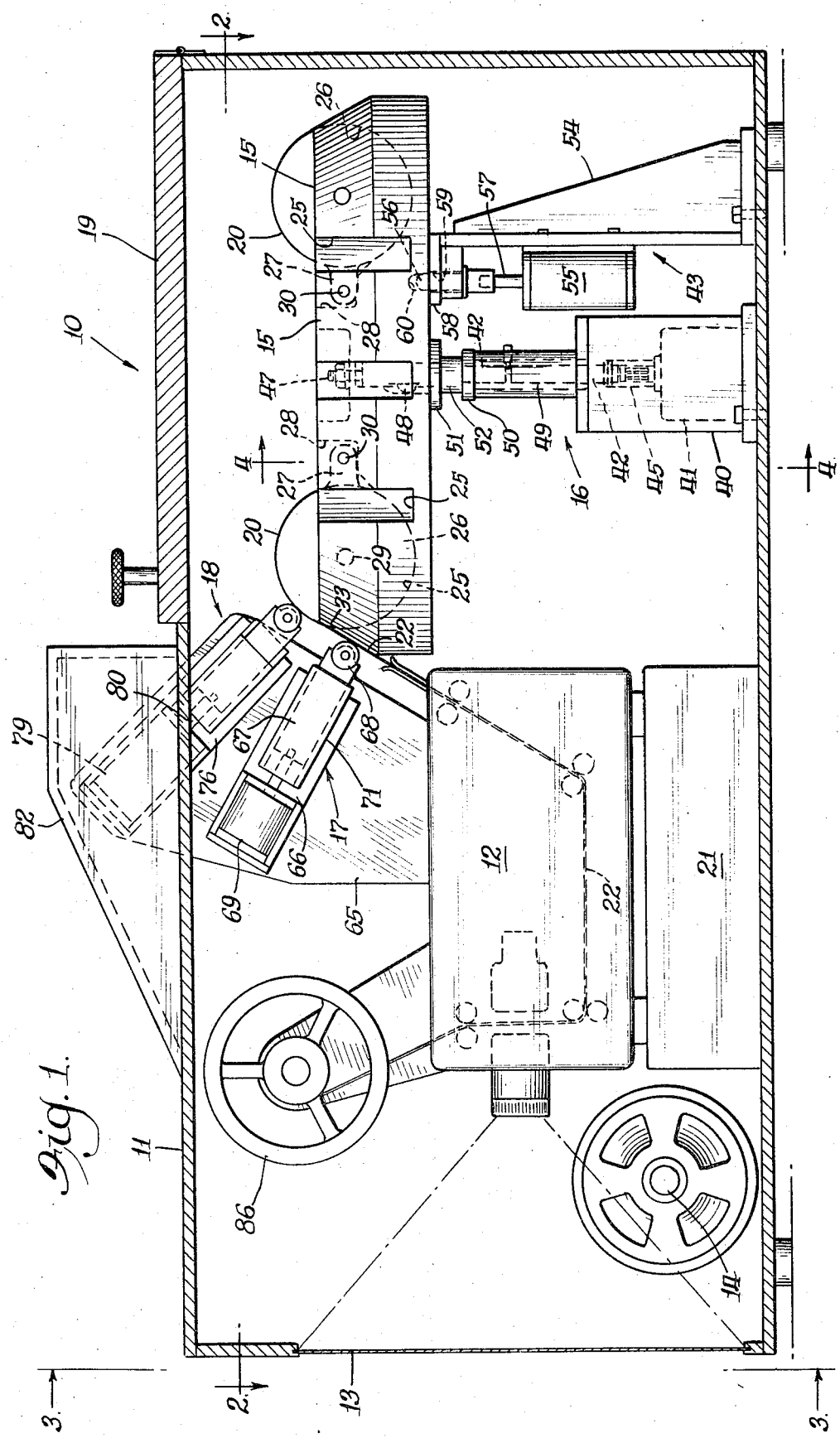

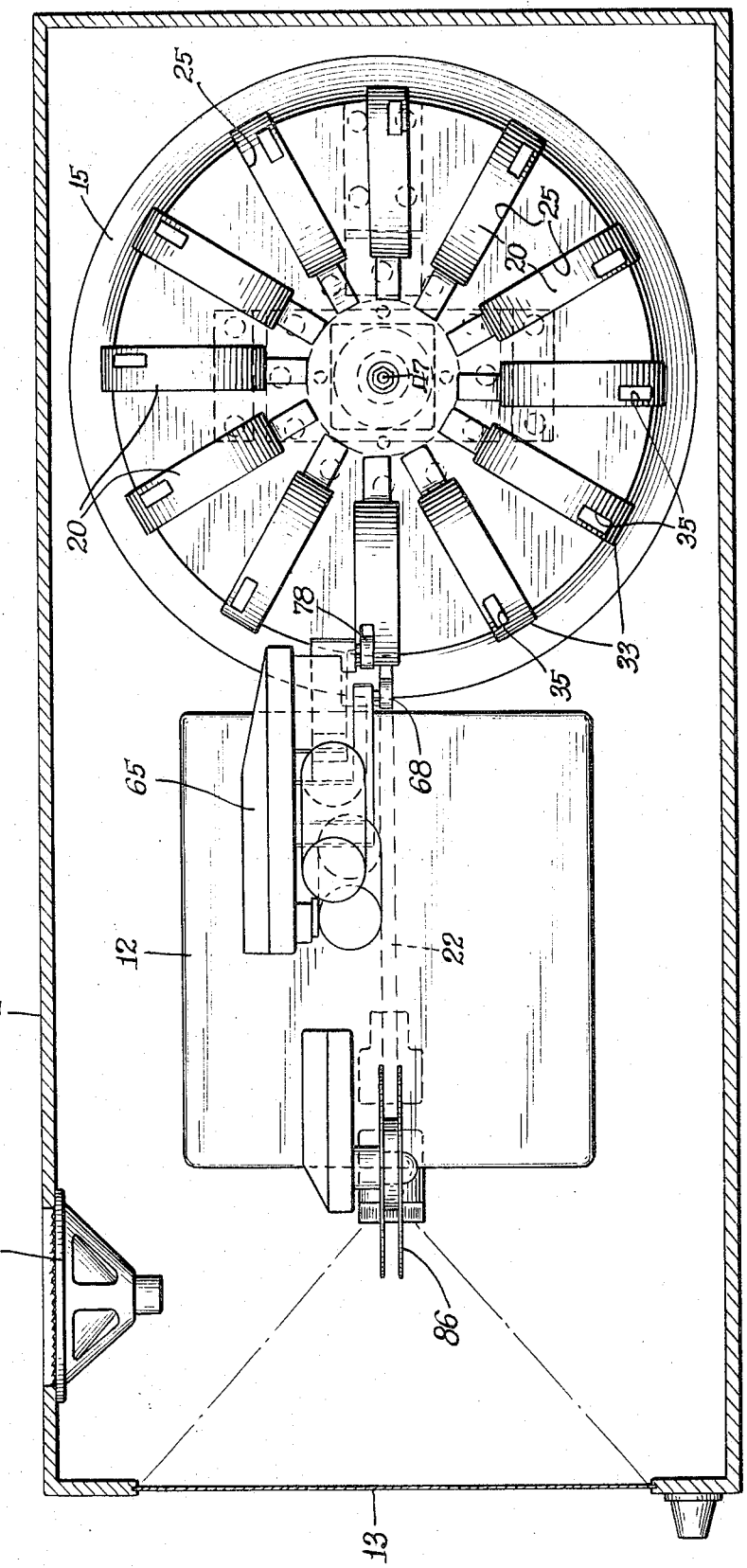

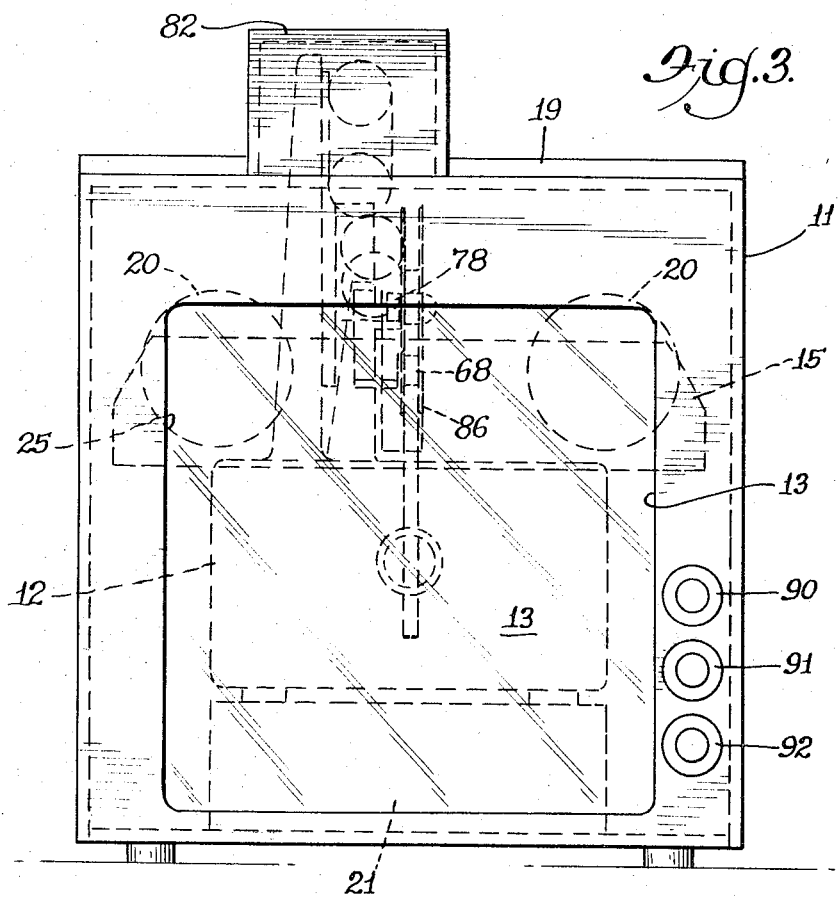
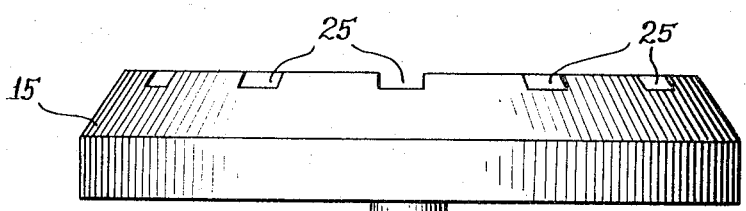

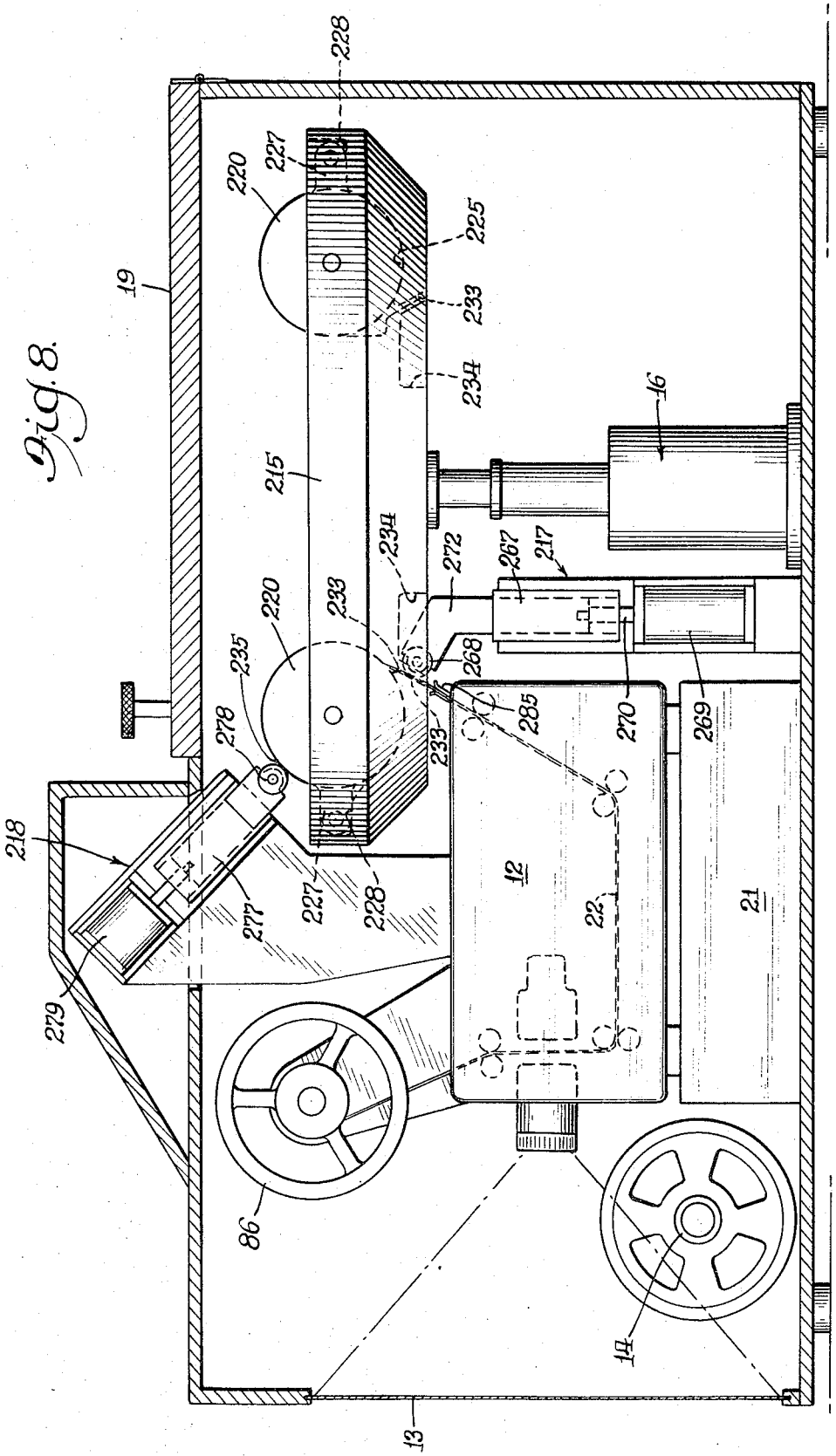

AUTOMATIC SOUND FILM PROJECTOR-PLAYER

BACKGROUND OF THE INVENTION

This invention relates to the field of motion picture projector units and more particularly to a projector-player unit of the self-threading type having an automatic film cartridge selection and changing mechanism.

DESCRIPTION OF THE PRIOR ART

Cartridge players for tape recorders and magazine type film projectors are well known in the art. A self-threading projector-player of the same general type as herein disclosed has been described in my copending application for U.S. Pat. Ser. No. 806,619 filed Mar. 12, 1969, for Projector-Player, now U.S. Pat. No. 3,687,560.

SUMMARY OF THE INVENTION

It is an object of the present invention to provide an improved film cartridge selection apparatus for a projector-player including an easily loadable cartridge magazine in the form of a rotatable drum mounted to rotate in a horizontal plane adjacent the projector and adapted to be firmly locked in a number of selective positions.

It is a more particular object to provide a device of the type described above and including automatic electrically actuated film drive and rewind mechanisms mounted adjacent the cartridge magazine and sequentially operable to feed the film from a selected cartridge into the projector and subsequently rewind the film back into the cartridge.

It is an additional object to provide a modified form of cartridge magazine in the shape of a rectangular carriage formed with a plurality of parallel retaining pockets and being transversely movable in a horizontal plane for presenting a selected cartridge to the projector.

Other objects and advantages of this invention will become more readily apparent when considered in connection with the accompanying drawings.

BRIEF DESCRIPTION OF THE DRAWINGS

FIG. 1 is a side view, partially in phantom, and partially cut-away, of the projector-player of the present invention;

FIG. 2 is a top view, taken on line 2—2 of FIG. 1;

FIG. 3 is a phantom front view, taken on line 3—3 of FIG. 1;

FIG. 4 is a fragmentary view of the indexing drive motor and cartridge drum, taken on line 4—4 of FIG. 1;

FIG. 8 is a side view of a modified arrangement of the film advance and rewind motors for the player of FIG. 1.

DESCRIPTION OF THE PREFERRED EMBODIMENT

Figure 5:
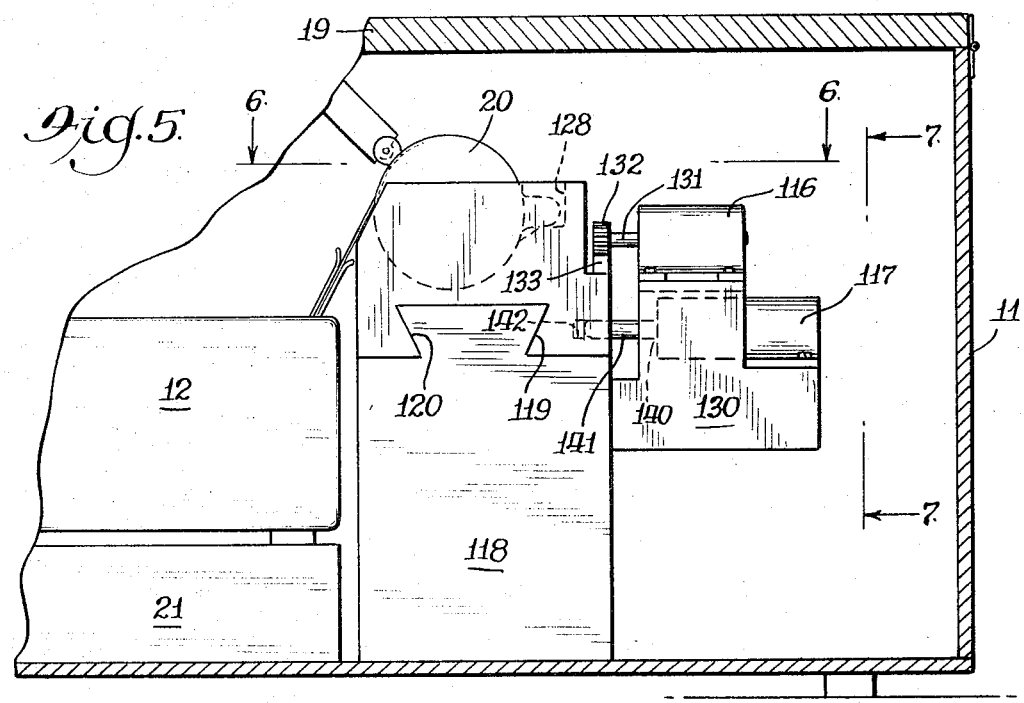
FIG. 5 is a fragmentary side view of a modified form of cartridge magazine and selector mechanism.

The complete home entertainment unit of the present invention is in the form of a unitary projector-player, designated by the numeral 10, and comprises: a housing 11, a projector 12 contained within the housing 11, a screen 13, a speaker 14, a film cartridge magazine or retaining drum 15, a drive mechanism 16 for indexing the drum 15, a film advance mechanism 17, and a film rewind mechanism 18. A hinged lid 19 is provided on the top of the housing 11 for easy access in loading and unloading the projector-player 10 with a plurality of sound-film cartridges 20.

The screen 13 is of the rear-projection type and is mounted in the front wall of the housing 11. The projector 12 is mounted on a suitable support stand 21 within the housing 11 so that its axis of projection is normal to the center of the screen 13. A film 22 in one of the cartridges 20 is threaded through the projector 12 and displayed on the screen 13. The sound from the film 22 is also picked up by the projector 12 and broadcast through the speaker 14. In order to reverse the projected image the image may be projected initially onto mirror means from which it is reflected onto the screen.

The cartridge magazine 15 is generally in the form of a cylindrical drum and is formed on its upper side with a plurality of radial slots 25 for retaining the film cartridges 20. The film cartridge 20 is of the same general type as disclosed in my pending applications for U.S. Pat. Ser. Nos. 806,619, filed Mar. 18, 1969, now U.S. Pat. No. 3,687,560 and 131,163, filed Apr. 5, 1971, now U.S. Pat. No. 3,744,737. The film cartridge 20, preferably molded from plastic, is in the form of a flat cylindrical shell 26, and has an integral radial tab or tongue 27. The tongue 27 serves as an orienting or locating guide for the cartridge 20 and is received in a slot 28 of reduced width. The shell 26 and tab 27 are each formed with circular holes or depressions 29 and 30. The slots 25 and 28 are formed on their inner walls with raised protrusions 31 and 32, respectively, which engage the depressions 29 and 30 for securely holding the cartridge 20 within the slot 25. The cartridge shell 26 also is formed with a tangential slot 33 in its outer cylindrical wall 34, through which the film 22 is advanced into the projector. The wall 34 is also formed with a rectangular aperture or window 35 to provide access for rewinding the film 22. The cartridge magazine 15 is mounted to rotate in a horizontal plane, being supported on its vertical axis by the drive mechanism 16.

The indexing drive mechanism 16 comprises an inverted "U" shaped support stand 40, a motor 41, a drive shaft 42, and a solenoid actuated locking device 43. The support stand 40 and motor 41 are mounted on the interior of the bottom of the housing 11 with the motor 41 disposed within the stand 40. The motor 41 has a splined vertical output shaft 44 which is attached to the drive shaft 42 by an internally splined coupling 45 and transverse pin 46. The drive shaft 42 extends upward through the top of the support stand 40 and is attached to the drum 15 by means of a nut 47 and key 48. A sleeve bearing 49 surrounds the shaft 42 on top of the stand 40, and a thrust bearing 50 rests on top of the sleeve 49 and carries the weight of the drum 15. A washer 51 and spacer 52 are disposed between the drum 15 and bearing 54.

The locking device 43 comprises a vertical support 54, a solenoid 55, and shot pin 56. The solenoid 55 has an armature 57 oriented to move in a vertical dimension and to which the shot pin 56 is attached. The upper end of the support 54 carries a horizontal pad 58 which bears against the drum 15. The shot pin 56 extends through a hole 59 in the pad 58 and engages one of a plurality of circumferentially spaced indexing holes 60 formed in the underside of the drum 15. A sleeve bearing 61 is disposed in the hole 59 and serves as a guide for the shot pin 56. An indexing hole 60 is provided corresponding to each of the cartridge slots 25 and is engaged by the shot pin 56 for holding the magazine 15 firmly in position during the time a particular cartridge 20 is being played.

A vertical support bracket 65 is mounted on top of the projector 12, and the film advance mechanism 17 and rewind mechanism 18 are mounted on this bracket. The film advance mechanism 17 comprises a base 66 attached to the bracket 65, a drive motor 67 carrying a right-angle film drive wheel 68, and a solenoid 69. The solenoid 69 has an armature 70 attached to the motor 67 and is adapted when energized to move the motor 67 into position where the wheel 68 engages and rotates to advance the film 22 into the projector. A motor guideway 71 is attached to the base 66 and supports the motor 67 throughout its limits of motion.

Similarly, the rewind mechanism 18 comprises a base 76, a motor 77 with a right-angle film rewind wheel 78, a solenoid 79, armature 80, and motor guideway 81. When the solenoid 79 is energized, the drive motor is caused to move longitudinally bringing the rewind wheel 78 into engagement with the film cartridge drum through the aperture 35 to rewind the film into the cartridge 20. The roof of the housing 11 is raised at 82 to accommodate the upper end of the bracket 65 and solenoid 79.

Suitable electrical controls and timing means (not shown) are provided for the operation of the various components of the invention. In operation, the various film cartridges 20 can be played selectively or continuously, as desired. The unit is operated by appropriate electrical controls including an on-off switch 90, a volume control 91 and a start switch 92. In one mode of operation, the unit stops after a film is shown and the sequence of operation is repeated by pushing the start switch.

To select a particular cartridge 20, the solenoid 55 is energized to withdraw the shot pin 56, the motor 41 is energized to rotate the drum 15 until the desired cartridge 20 is aligned with the film entry slot 85 of the projector 12. The solenoid 55 is again energized (or deenergized if it is of the spring-loaded type) to return the shot pin 56 to the new hole 60. The solenoid 69 is then energized so as to bring the film advance wheel 68 into contact with the free end of the film 22 and the motor 67 driving the wheel 68 causes the film 22 to enter into the slot of the projector 12. The solenoid 69 is then deenergized and retracts. The projector 12 is of the self-threading type, and the film 22 is automatically fed through the projector to a take-up reel 86 where it is collected as the film 22 is played. Upon completion of play, the projector stops, and the solenoid 79 is energized to bring the rewind wheel 78 into contact with the cartridge drum for returning the film 22 into the cartridge. The solenoid 79 is again energized to return the motor 77 to its retracted position. In the case of solenoids 69 and 79, if the solenoid is of the spring-loaded type, it is deenergized to return the motor to its original position.

Figure 6:
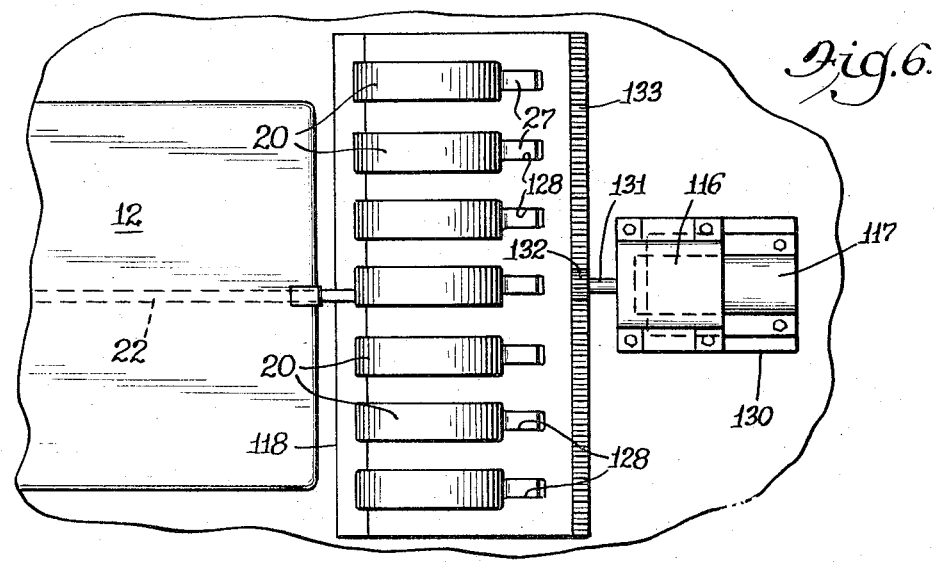
FIG. 6 is a top view taken on line 6—6 of FIG. 5.
Figure 7:
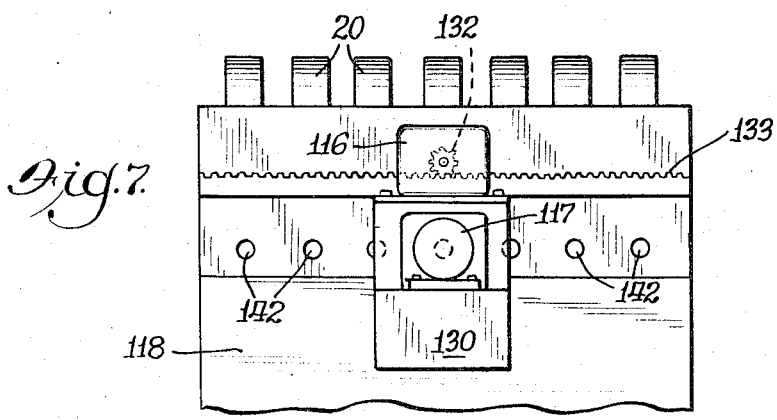
FIG. 7 is a rear view taken on line 7—7 of FIG. 5.

FIGS. 5, 6 and 7 shown an alternative embodiment for selecting and feeding the film cartridges to the projector. This embodiment of the projector-player is designated by the numeral 110 and comprises a rectangular cartridge magazine 115, a drive motor 116, and an indexing solenoid 117. The magazine 115 is supported on an elevated base 118 which is formed on its upper surface with a dovetail slide 119. The underside of the magazine 115 is formed with a mating dovetail surface 120 for engaging the slide 119. The slide 119 is oriented in a horizontal plane, transverse to the axis of projection. The magazine 115 is formed on its upper surface with a plurality of parallel cartridge retaining slots 125. The film cartridges 20 that may be employed in this embodiment may be identical to that previously described.

A supporting bracket 130 is attached to the side of the base 118 opposite the projector for mounting the drive motor 116 and indexing solenoid 117. The motor 116 has an output shaft 131 which carries a pinion gear 132. The gear 132 engages a rack 133 mounted on the side of the cartridge magazine 115 and, when the motor 116 is energized, causes the magazine 115 to move along the slide 119.

The solenoid 117 has an armature 140 which carries a shot pin 141 adapted to engage selectively one of a plurality of indexing holes 142 formed in the side of the magazine 115 beneath the rack 133. One such hole 142 is provided corresponding to each of the cartridge slots 125. Film advance and rewind motors (not shown) may be provided as described in the previous embodiment.

In operation, a particular cartridge 20 is selected by first energizing the solenoid 117 to retract the shot pin 141 from a hole 142; the motor 116 is then energized in either the forward or reverse direction to cause the magazine 115 to move along the slide 119 until the desired cartridge 20 is aligned with the film entry slot in the projector. The solenoid 117 is again deenergized causing the shot pin 141 to enter the indexing hole 142 and thereby firmly holding the magazine 115 in place while the film 22 is being played. Upon completion of play, the film 22 is returned to its cartridge 20 and the cycle repeated.

Still another embodiment of the invention, similar to that shown in FIG. 1, is illustrated in FIG. 8. In this embodiment the film cartridge magazine or drum 215 is raised and modified to provide an alternative means of feeding the film 22 from a cartridge 220 into the projector. In addition, the film advance mechanism 217 is relocated to a point beneath the drum 215. The cartridges 220 to be used in this embodiment must also be modified to provide a rewind aperture 235 in an alternate position, or the original cartridges provided with an additional aperture so as to make the cartridge compatible with either embodiment.

The cartridge drum 215 is formed on its upper side with a plurality of radial cartridge retaining slots or pockets 225. Each of the slots 225 has a radial outward extension 228 of reduced dimensions for receiving the locating tab 227 of cartridge 220. Each of the pockets 225 has a film feeding slot 233 which extends through the bottom of the drum 215. The drum 215 is also formed on its under side with an annular groove 234 for accommodating the head of the film advance mechanism 217 and an aperture 236 at each slot 233 for receiving the film drive wheel 268.

The film advance mechanism 217 is mounted in an upright position between the projector and indexing drive mechanism 16. The drive motor 267 is attached to the armature 270 of the solenoid 269 and is moved upward when the solenoid 269 is energized. The motor 267 has an elbow drive connection 272 to facilitate the entry of the drive wheel 268 into the aperture 236 to engage the film 22.

In operation, this embodiment of the invention is used as follows: The drum 215 is loaded with a plurality of film cartridges 220 into the pockets 225. A short strip of film 22 is inserted through each of the slots 233 to facilitate feeding the film into the projector. The drum 215 is rotated by the drive mechanism 16 so as to bring the desired cartridge 220 into alignment with the projector. The solenoid 269 is energized moving the motor 267 and drive wheel 268 upward and bringing the wheel 268 into contact with the strip of film 22 in the slot 233. The drive wheel 268 feeds the film 22 through the entry slot 285 into the projector. Once the film 22 has been started through the projector, it is picked up by the take-up reel 86 and the drive wheel 268 may be removed from contact with the film 22 through the aperture 236. This is accomplished by de-energizing the solenoid 269 and allowing the motor 267 to be lowered by gravity to its lowermost position.

Upon completion of play, the rewind motor 218 is actuated by energizing the solenoid 279 and bringing the rewind wheel 278 into contact with the film 22 through aperture 235. It should be noted that the rewind wheel 278 may not actually contact the film 22, but may contact an outer rim of a film spool (not shown) within the cartridge 220. After the film 22 has been rewound, the rewind solenoid 279 is again energized (or deenergized if it is of the spring loaded type) and the wheel 278 is retracted from the cartridge 220.

While certain preferred embodiments of the invention have been disclosed it will be appreciated that these are shown by way of example only, and the invention is not to be limited thereto as other variations will be apparent to those skilled in the art and the invention is to be given its fullest possible interpretation within the terms of the following claims.

I claim:

1. An automatic sound film cartridge projector apparatus comprising:
   a housing having a plurality of side walls;
   a self-threading sound film projector disposed within said housing;
   screen projection means supported on one of said side walls for viewing the pictures reproduced by said projector;
   selectively positionable film cartridge magazine means for retaining a plurality of film cartridges operatively associated with said projector, said magazine means comprising a rotatable drum formed with a plurality of radial cartridge retention slots, said drum being mounted to rotate in a horizontal plane adjacent to said projector;
   first electrically actuated drive means for feeding the film from a selected cartridge in said magazine means to said projector, said first electrically actuated drive means comprising an electric motor carrying a film drive wheel and a solenoid operatively associated with said motor and operable when actuated to move said drive wheel towards said drum into contact and with the film for feeding the film along the drum into said projector; and
   second electrically actuated drive means for rewinding the film into the cartridge upon completion of play by said projector.

2. The apparatus of claim 1 including
   electrically actuated drive means operatively associated with said drum operable to rotate said drum to a plurality of selective positions wherein one of the cartridges may be aligned with a film intake slot to said projector.

3. The apparatus of claim 1 including
   electrically actuated locking means operatively associated with said drum and operable to hold said drum in a selective position during the time the film cartridge is being played and rewound.

4. The apparatus of claim 1 wherein
   said second electrically actuated drive means comprises an electric motor carrying a film drive wheel and a solenoid operatively associated with said motor and operable when actuated to move said drive wheel into a driving position for rewinding the film into the cartridge upon completion of play by the projector.

5. The apparatus of claim 1 wherein
   said drum is formed with a film feed slot extending through the bottom of said drum and in communication with said cartridge retention slot.

6. The apparatus of claim 5 wherein
   said first electrically actuated drive means is mounted beneath said rotatable drum and is operable to feed film from a selected cartridge through said film feed slot into a film intake slot associated with said projector.

* * * * *